US012749593B2

(12) United States Patent
Tomizawa et al.

(10) Patent No.: US 12,749,593 B2
(45) Date of Patent: Sep. 29, 2026

(54) CONDUCTIVE FILM

(71) Applicant: FUJIFILM Corporation, Tokyo (JP)

(72) Inventors: Hideki Tomizawa, Kanagawa (JP); Kazuhiro Hasegawa, Kanagawa (JP); Takahiro Ohno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 229 days.

(21) Appl. No.: 18/608,436

(22) Filed: Mar. 18, 2024

(65) Prior Publication Data

US 2024/0321482 A1 Sep. 26, 2024

(30) Foreign Application Priority Data

Mar. 20, 2023 (JP) ................................ 2023-043964

(51) Int. Cl.

| | |
|---|---|
| ***B32B 3/10*** | (2006.01) |
| ***B32B 3/14*** | (2006.01) |
| ***B32B 3/16*** | (2006.01) |
| ***H01B 1/22*** | (2006.01) |
| ***H01B 1/24*** | (2006.01) |
| ***H01B 5/14*** | (2006.01) |

(52) U.S. Cl.

CPC ................ *H01B 5/14* (2013.01); *B32B 3/10* (2013.01); *B32B 3/14* (2013.01); *B32B 3/16* (2013.01); *H01B 1/22* (2013.01); *H01B 1/24* (2013.01)

(58) Field of Classification Search

CPC .... B32B 3/00; B32B 3/10; B32B 3/14; B32B 3/16; B32B 3/30

See application file for complete search history.

(56) References Cited

FOREIGN PATENT DOCUMENTS

JP 2018-150584 A 9/2018

OTHER PUBLICATIONS

JP 2013-207263 (Year: 2013).*
JP 2021-155814 (Year: 2021).*

* cited by examiner

*Primary Examiner* — Elizabeth E Mulvaney
(74) *Attorney, Agent, or Firm* — Edwards Neils LLC; Jean C. Edwards, Esq.

(57) ABSTRACT

A conductive film having excellent adhesiveness of a conductive thin wire after a durability test film includes: a transparent substrate; and a mesh pattern that is disposed on the transparent substrate and is formed of a conductive thin wire, in which the conductive thin wire includes a black layer including carbon black, a palladium-containing layer, and a metal plating layer in order from the transparent substrate side.

6 Claims, 2 Drawing Sheets

CONDUCTIVE FILM

CROSS-REFERENCE TO RELATED APPLICATIONS

The present application claims priority under 35 U.S.C. § 119 to Japanese Patent Application No. 2023-043964 filed on Mar. 20, 2023. The above application is hereby expressly incorporated by reference, in its entirety, into the present application.

BACKGROUND OF THE INVENTION

1. Field of the Invention

The present invention relates to a conductive film.

2. Description of the Related Art

A conductive film having a conductive thin wire (thin wiring line that has conductivity) is widely used in various uses in, for example, a touch panel, a solar cell, and an electro luminescence (EL) element. In particular, recently, the rate of installation of a touch panel on a mobile phone or a mobile game device has been increasing, and demand for a conductive film for a capacitance type touch panel capable of multi-point detection has been rapidly increasing.

As the conductive film including the conductive thin wire, for example, JP2018-150584A discloses a technique relating to a transparent substrate with a conductive pattern including: a transparent substrate; a thin wire pattern portion that is provided on one surface of the transparent substrate and includes a coating composition for electroless plating including metal particles as nuclei of electroless plating; and an electroless plating layer that is provided on a surface of the thin wire pattern portion opposite to the transparent substrate.

SUMMARY OF THE INVENTION

The present inventors prepared a conductive film having a mesh pattern formed of a conductive thin wire with reference to JP2018-150584A, and conducted an investigation on characteristics of the prepared conductive film. As a result, it was found that, in the conductive film after a durability test, adhesiveness of the conductive thin wire may deteriorate such that the conductive thin wire peels off from the transparent substrate.

The present invention has been made under these above-described circumstances, and an object thereof is to provide a conductive film having excellent adhesiveness of a conductive thin wire after a durability test.

As a result of thorough investigation to achieve the object, the present inventors found that the object can be achieved by the following configurations.

[1] A conductive film comprising:

a transparent substrate; and a mesh pattern that is disposed on the transparent substrate and is formed of a conductive thin wire, in which the conductive thin wire includes a black layer including carbon black, a palladium-containing layer, and a metal plating layer in order from the transparent substrate side.

[2] The conductive film according to [1], in which a line width of the metal plating layer is 1.0 to 2.5 μm.

[3] The conductive film according to [1] or [2], in which a line width of the black layer is 0.85 to 1.90 μm.

[4] The conductive film according to any one of [1] to [3], in which a ratio of a line width of the metal plating layer to a line width of the black layer is more than 1 to 1.1.

[5] The conductive film according to any one of [1] to [4], in which a thickness of the black layer is 0.2 to 2.0 μm.

[6] The conductive film according to any one of [1] to [5], in which an average particle diameter of the carbon black in the black layer is 10 to 120 nm.

[7] The conductive film according to any one of [1] to [6], in which a content of the carbon black is 2 to 20 mass % with respect to a total mass of the black layer.

According to the present invention, a conductive film having excellent adhesiveness of a conductive thin wire after a durability test can be provided.

DESCRIPTION OF THE PREFERRED EMBODIMENTS

Figure 1:
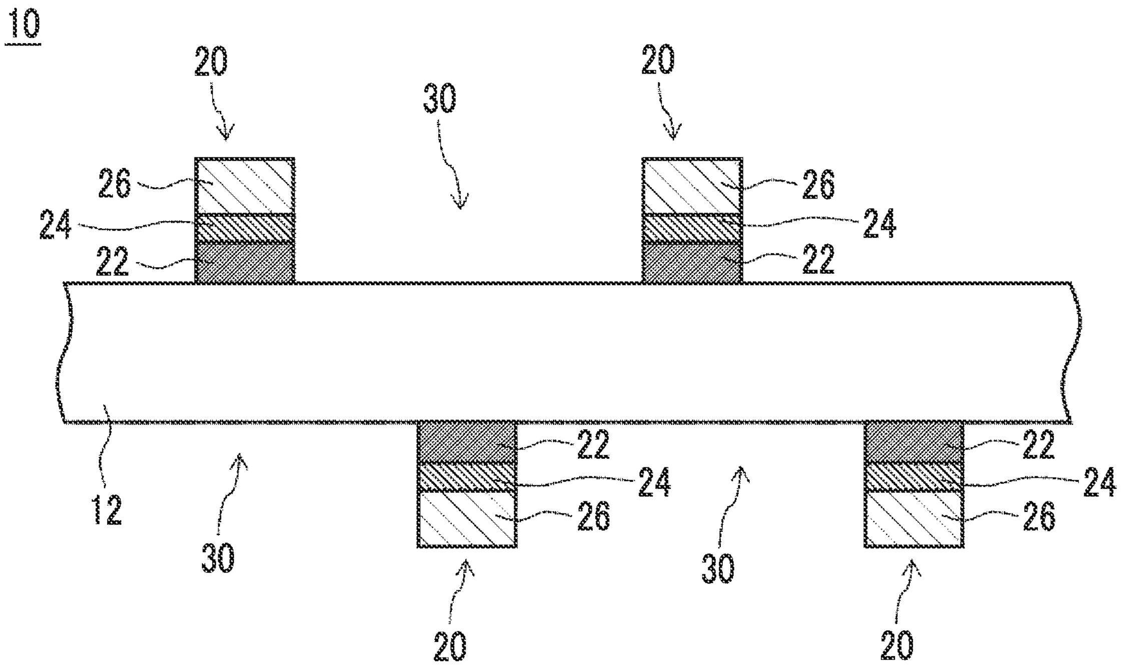
FIG. 1 is a schematic cross-sectional view showing an example of a configuration of a conductive film according to the present invention.

Hereinafter, the present invention will be specifically described.

The following configuration requirements will be described based on typical embodiments of the present invention in some cases, but the present invention is not limited to the embodiments. Further, the drawings described below are conceptual diagrams showing the present invention, and a positional relationship, the size, a thickness, a shape, and the like of each of components are different from actual ones.

In the present specification, numerical ranges represented by "to" include numerical values before and after "to" as lower limit values and upper limit values.

In the present specification, in a case where two or more components corresponding to one component are present, "content" of the component represents a total content of the two or more components.

In the present specification, one member or a composition "substantially not including" one component represents that a content of the target component is 0.1 mass % or less with respect to a total mass of the member or the composition.

In the present specification, "g" and "mg" represent "mass g" and "mass mg", respectively.

In the present specification, "polymer" or "polymer compound" represents a compound having a weight-average molecular weight of 2000 or higher. Here, the weight-average molecular weight is defined as a value in terms of polystyrene by Gel Permeation Chromatography (GPC).

In the present specification, unless specified otherwise, an angle represented by a specific numerical value and the description regarding an angle such as "parallel", "perpendicular", or "orthogonal" includes an error range that is generally allowable in the corresponding technical field.

In the present specification, "width direction" of a conductive thin wire each of layers forming a conductive thin wire represents a direction orthogonal to a direction in which a conductive thin wire extends among directions along a surface of a substrate, and "line width" of the conductive thin wire or each of the layers represents a total length of the conductive thin wire or each of the layers in the width direction.

Conductive Film

A conductive film according to an embodiment of the present invention includes: a transparent substrate; and a mesh pattern that is disposed on the transparent substrate and is formed of a conductive thin wire, in which the conductive thin wire includes a black layer including carbon black, a palladium-containing layer, and a metal plating layer in order from the transparent substrate side.

The present inventors conducted an investigation on durability of a conductive film including a transparent substrate and a mesh pattern that is formed of a conductive thin wire. As a result, the present inventors found that adhesiveness of the conductive thin wire after a durability test can be improved by providing a palladium-containing layer (hereinafter, also referred to as "Pd-containing layer") and a metal plating layer in the conductive thin wire and further providing a laminated structure where a black layer including carbon black is inserted between the transparent substrate and the Pd-containing layer, thereby completing the present invention.

The present inventors found that, in the conductive film where the conductive thin wire including the Pd-containing layer and the metal plating layer is disposed on the transparent substrate, a phenomenon in which the conductive thin wire is likely to peel off over time may occur. On the other hand, the present inventors found that, in the conductive film according to the embodiment of the present invention where the black layer including carbon black is provided between the transparent substrate and the Pd-containing layer, the above-described phenomenon in which the conductive thin wire is likely to peel off can be suppressed.

Hereinafter, in the present specification, in a case where the adhesiveness of the conductive thin wire after the durability test with the conductive film, it can also be described that "the effect of the present invention is excellent".

Hereinafter, the conductive film according to the embodiment of the present invention (hereinafter, also referred to as "present conductive film") will be described in more detail with reference to the drawings.

FIG. 1 is a schematic cross-sectional view showing an example of a configuration of the present conductive film.

A conductive film 10 shown in FIG. 1 includes a transparent substrate 12; and a conductive thin wire 20 that is disposed on the transparent substrate 12. The conductive thin wire 20 has a laminated structure that is formed of a black layer 22, a Pd-containing layer 24, and a metal plating layer 26 in order from the transparent substrate 12 side.

A mesh pattern is formed of the conductive thin wire 20 disposed on the transparent substrate 12. That is, on the transparent substrate 12, the conductive thin wire 20 that is disposed in a mesh shape and a non-thin wire region 30 where the conductive thin wire 20 is not disposed are present.

In the conductive film 10 shown in FIG. 1, the conductive thin wire 20 forming the mesh pattern is disposed on each of both surfaces of the transparent substrate 12. Note that the present conductive film is not limited to the aspect shown in FIG. 1, and the conductive thin wire may be disposed on only one surface of the transparent substrate. For example, in a case where the conductive thin wire is used in a display device such as a touch panel, the conductive thin wire may be disposed on a visible-side surface (hereinafter, referred to as "top surface") of the transparent substrate, or may be disposed on a display element-side surface (hereinafter, referred to as "bottom surface") of the transparent substrate.

In the conductive film, in a case where the conductive thin wire including the black layer, the Pd-containing layer, and the metal plating layer in this order is disposed on the bottom surface of the transparent substrate, adhesiveness of the conductive thin wire after a durability test can be improved, and further a phenomenon (so-called "wire visibility") in which reflected light from the Pd-containing layer and/or the metal plating layer is visible in a case where the conductive film is irradiated with external light can be suppressed.

Figure 2:
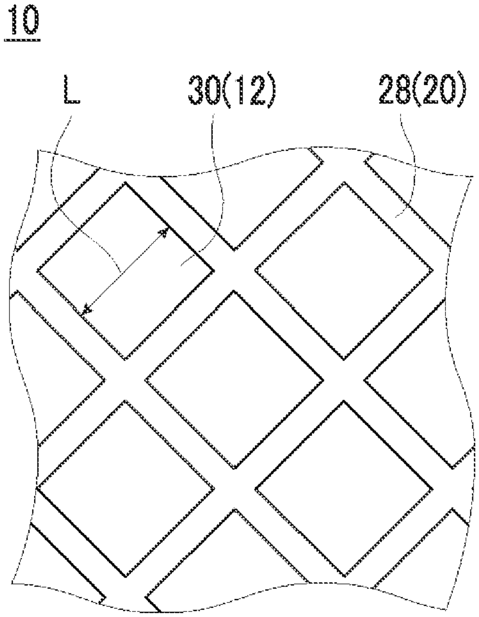
FIG. 2 is a plan view showing an example of a configuration of a mesh pattern in the conductive film according to the present invention.

FIG. 2 is a plan view showing an example of a configuration of the mesh pattern in the present conductive film.

FIG. 2 is a plan view in a case where the conductive film 10 shown in FIG. 1 is observed from a normal direction of the surface of the transparent substrate 12 where the conductive thin wire 20 is disposed. As shown in FIG. 2, a mesh pattern 28 formed of the conductive thin wire 20 is disposed on one surface of the transparent substrate 12 of the conductive film 10, and a plurality of non-thin wire region 30 that are surrounded by the mesh pattern 28 and are spaced from each other are present.

The disposition configuration and the number of the conductive thin wire in the present conductive film and the shape and the size of the mesh pattern are not limited to the aspects shown in FIGS. 1 and 2. The details of the mesh pattern in the present conductive film will be described below.

Hereinafter, unless specified otherwise, the simple description of "mesh pattern" represents the mesh pattern that is formed of the conductive thin wire in the present conductive film.

Each of the members in the conductive film will be described.

Transparent Substrate

The kind of the transparent substrate is not particularly limited as long as it is a member that can support the mesh pattern, and examples thereof include a resin substrate.

In the present specification, "transparent substrate" represents a substrate having a total light transmittance of 80% or more. The total light transmittance is measured using "Plastics —Determination of Total Luminous Transmittance and Reflectance" defined by JIS (Japanese Industrial Standards) K 7375:2008.

The total light transmittance of the transparent substrate is preferably 85% to 100%.

It is preferable that the transparent substrate has flexibility. The transparent substrate having flexibility refers to a transparent substrate that can be bent and specifically refers to a transparent substrate that is not broken even after being bent at a bending curvature radius of 2 mm. The flexible transparent substrate has workability to the degree to which it can be formed in a three-dimensional shape. Examples of the transparent substrate having flexibility include a resin substrate.

As a resin forming the transparent substrate, for example, a resin having a melting point of about 290° C. or lower such as polyethylene terephthalate (PET) (258° C.), polycycloolefin (134° C.), polycarbonate (250° C.), an acrylic film (128° C.), polyethylene naphthalate (PEN) (269° C.), polyethylene (PE) (135° C.), polypropylene (163° C.), polystyrene (230° C.), polyvinyl chloride (180° C.), polyvinylidene chloride (212° C.), or triacetyl cellulose (290° C.) is preferable, and PET, polycycloolefin, or polycarbonate is more preferable. Among these, PET is more preferable from the viewpoint of excellent adhesiveness of the conductive thin wire. The numerical value in the brackets is the melting point or the glass transition temperature.

A material forming the transparent substrate may be a material that can cause exposure light such as ultraviolet light to pass from a back surface side to expose a photoresist provided on the transparent substrate in a case where the mesh pattern is formed on the transparent substrate.

The photoresist is set to be exposed using ultraviolet light in many cases, and from the viewpoint of optical wavelength sensitivity characteristics of the photoresist and accurate pattern formability of μm level, a g-ray (436 nm) is likely to be used. In addition to the g-ray, short-wavelength ultraviolet light such as an i-ray (365 nm), a KrF excimer laser (248 nm), an ARF excimer laser (193 nm), or a F2 excimer laser (157 nm) may also be used.

In a step of forming the member on the transparent substrate, in a case where the exposure light is caused to pass through the transparent substrate to expose the photoresist, it is desirable to select a transparent substrate having excellent optical transmittance for the exposure light. Alternatively, in a case where the exposure light is caused to pass through the transparent substrate to expose the photoresist, it is desirable to select each a material of the photoresist and a wavelength of a light source for exposure depending on optical transmittance of the transparent substrate corresponding to the wavelength.

As the material forming the transparent substrate, PET, polycycloolefin, or an acrylic resin is preferable from the viewpoint of further improving the transmittance of ultraviolet light.

In addition, PEN or PET is preferable from the viewpoint of further improving durability in a use environment for use as an electronic material.

The thickness of the transparent substrate is not particularly limited and is likely to be 25 μm to 500 μm. In a case where the transparent substrate surface is used as a touch surface for the application of the conductive film to a touch panel, the thickness of the transparent substrate may exceed 500 μm.

Mesh Pattern

The mesh pattern is a member formed of the conductive thin wire disposed on the transparent substrate in a mesh shape. The conductive thin wire is a member having a thin wire shape that has the laminated structure including the Pd-containing layer and the metal plating layer, and is responsible for main conductive characteristics of the conductive film.

The conductive thin wire has the laminated structure that is formed of the black layer, the Pd-containing layer, and the metal plating layer in order from the transparent substrate side.

The mesh shape refers to a shape that is formed of the conductive thin wires 20 intersecting with each other and includes the plurality of non-thin wire regions 30 spaced from each other as in the mesh pattern 28 shown in FIG. 2. In FIG. 2, the non-thin wire region 30 has a square shape having one side length of L. However, the non-thin wire region that is divided by the conductive thin wire in the mesh pattern may have another shape, for example, a polygonal shape (for example, a triangular shape, a quadrangular shape (a rhombic shape, a rectangular shape, or the like), a hexagonal shape, or a random polygonal shape). Further, the shape of one side may be a curved shape other than a straight line or may be an arc shape. In a case where the shape of one side is an arc shape, for example, two sides facing each other may have an arc shape that is outwardly convex, and the other two sides facing each other may have an arc shape that is inwardly convex. In addition, the shape of each of the sides may have a wavy line shape in which an arc that is outwardly convex and an arc that is inwardly convex are continuous. Of course, the shape of each of the sides may be a sine curve shape.

The length L of one side of the non-thin wire region 30 that is a square lattice shape is not particularly limited, and it is preferably 1500 μm or less, more preferably 1300 μm or less, and still more preferably 1000 μm or less. The lower limit value of the length L is not particularly limited but is preferably 5 μm or more, more preferably 30 μm or more, and still more preferably 80 μm or more. In a case where the length of one side of the non-thin wire region is in the above-described range, the transparency can also be maintained more satisfactorily. In a case where the conductive film is attached to a front surface of a display device, the display can be recognized without discomfort.

From the viewpoint of visible light transmittance, an opening ratio of the mesh pattern is preferably 90% or more, more preferably 95% or more, and still more preferably 99% or more. The upper limit is not particularly limited and, for example, less than 100%.

The opening ratio refers to a ratio (area ratio) of the area of regions where the conductive thin wire is not disposed to the total area of the surface of the transparent substrate on the side where the mesh pattern of the conductive film is formed.

From the viewpoint of further improving the effect of the present invention, a line width Wa of the conductive thin wire is preferably 5.0 μm or less, more preferably 2.5 μm or less, and still more preferably 2.0 μm or less. The lower limit is not particularly limited, and from the viewpoint of further improving the effect of the present invention and the conductivity of the conductive film, is preferably 0.5 μm or more, more preferably 1.0 μm or more, and still more preferably 1.5 μm or more.

A thickness Ta of the conductive thin wire is not particularly limited, and from the viewpoint of further improving the conductivity of the conductive film, is preferably 0.1 μm or more and more preferably 0.3 μm or more. The upper limit is not particularly limited and is preferably 10 μm or less and more preferably 3 or μm or less.

The line width Wa and the thickness Ta of the conductive thin wire are obtained using the following method.

First, a platinum coating layer is formed using a sputtering method on the surface of the conductive film on the conductive thin wire side. Next, the conductive film including the platinum coating layer is cut by focused ion beam (FIB) milling along a plane including a width direction and a thickness direction to prepare a cross-sectional slice. By performing elemental analysis on the cross section of the obtained slice using a transmission electron microscope (for example, "Talos F200X S/TEM, manufactured by Thermo Fisher Scientific Inc.) with an energy dispersive X-ray spectrometer (EDS), an element mapping image of the cross section including the width direction and the thickness direction of the conductive thin wire is obtained. The line width and the thickness of the conductive thin wire are obtained based on the obtained element mapping image of the cross section of the conductive thin wire. For conductive thin wires at 10 positions that are freely selected, the preparation of the cross-sectional slice and the acquisition of the element mapping image of the obtained cross section are performed using the above-described method, and an arithmetic mean value of the measured line widths of the 10 positions and an arithmetic mean value of the measured thicknesses of the 10 points are calculated. As a result, the line width Wa and the thickness Ta of the conductive thin wire are obtained, respectively.

A more detailed method of measuring the line width Wa and the thickness Ta of the conductive thin wire and a line width and a thickness of each of the layers forming the conductive thin wire will be described in Examples below.

A line resistance value of the conductive thin wire is preferably lower than 200 Ω/mm. In particular, from the viewpoint of operability for use as a touch panel, the line resistance value is more preferably lower than 100 Ω/mm and still more preferably lower than 60 Ω/mm. The lower limit value is not particularly limited and is preferably 1 Ω/mm or higher.

The line resistance value is obtained by dividing a resistance value measured using a four probe method by a distance between measurement terminals. More specifically, both ends of any one conductive thin wire forming the mesh pattern are disconnected and separated from the mesh pattern. Next, four (A, B, C, D) microprobes (tungsten probes (diameter: 0.5 μm) manufactured by Micro Support Co., Ltd.) are brought into contact with the disconnected conductive thin wire, and a constant current I is applied to the outermost probes A and D using a source meter (2400 general-purpose source meter, manufactured by Keithley) such that a voltage V between the internal probes B and C is 5 mV, a resistance value Ri=V/I is measured, and the obtained resistance value Ri is divided by a distance between B and C to obtain the line resistance value.

In addition, the conductive thin wire may be or may not be electrically connected to an external member of the conductive film. A part of the conductive thin wire may be a dummy electrode that is electrically insulated from the outside.

Hereinafter, each of the layers forming the conductive thin wire will be described. A method of forming each of the layers below and a method of preparing the conductive thin wire will be described below in detail.

Black Layer

The present conductive film includes the black layer including carbon black.

The carbon black in the black layer is not particularly limited, and a well-known carbon black can be used.

From the viewpoint of further improving the effect of the present invention, an average particle diameter of the carbon black in the black layer in terms of sphere equivalent diameter is preferably 5 to 1000 nm, more preferably 10 to 120 nm, still more preferably 20 to 80 nm, and still more preferably 30 to 40 nm. The sphere equivalent diameter refers to the diameter of a spherical particle having the same volume. The average particle diameter of the carbon black is obtained as an average value obtained by measuring sphere equivalent diameters of 100 target particles and arithmetically averaging the measured sphere equivalent diameters.

In addition, an average primary particle diameter of the carbon black may be a catalog value.

From the viewpoint of further improving the effect of the present invention, the content of the carbon black in the black layer with respect to the total mass of the black layer is preferably 1 to 30 mass %, more preferably 2 to 20 mass %, still more preferably 5 to 20 mass %, and still more preferably 10 to 15 mass %.

It is preferable that the black layer further includes a resin.

Examples of the resin in the black layer include a polyurethane resin, a poly (meth)acrylic resin, a poly (meth) acrylic amide resin, an epoxy resin, a phenol resin, a polyimide resin, a polyester resin, a bismaleimide resin, a polyolefin resin, an isocyanate resin, a phenoxy resin, polyether sulfone, polysulfone, polyphenylene sulfone, polyphenylene sulfide, polyphenyl ether, polyether imide, and an acrylonitrile-butadiene-styrene copolymer (ABS resin).

The resin in the black layer is preferably a polyurethane resin or a poly (meth)acrylic resin. Examples of a material for forming the polyurethane resin include AITRON Z-913-3 (manufactured by Aica Kogyo Co., Ltd.). Examples of a material for forming the poly (meth)acrylic resin include polyethylene glycol diacrylate. As the polyethylene glycol diacrylate, for example, ARONIX M240 (manufactured by Toagosei Co., Ltd.) can be used.

The weight-average molecular weight of the resin in the black layer is not particularly limited and is preferably 2000 to 1000000, more preferably 2000 to 750000, and still more preferably 3000 to 500000.

The resin in the black layer may be used alone or in combination of two or more kinds.

The content of the resin in the black layer with respect to the total mass of the black layer is preferably 65 to 95 mass %, and more preferably 75 to 90 mass %.

The content of Pd in the black layer is preferably 10 mass % or less with respect to the total mass of the black layer, and it is more preferable that the black layer does not substantially include Pd. The lower limit is not particularly limited and may be 0 mass %.

In addition, the content of metal in the black layer is preferably 10 mass % or less with respect to the total mass of the black layer, and it is more preferable that the black layer does not substantially include metal. The lower limit is not particularly limited and may be 0 mass %.

Optionally, the black layer may include additives other than the above-described components.

Examples of the additives include a colorant other than carbon black, an UV absorber, and a light stabilizer.

The content of the additives in the black layer with respect to the total mass of the black layer is preferably 20 mass % or less and more preferably 5 mass % or less. The lower limit is not particularly limited and may be 0 mass %.

From the viewpoint of further improving the transmittance, a line width W1 of the black layer is preferably 2.00 μm or less, more preferably 1.90 μm or less, and still more preferably 1.50 μm or less. The lower limit is not particularly limited but is preferably 0.80 μm or more, more preferably 0.85 μm or more, and still more preferably 1.00 μm or more.

A thickness T1 of the black layer is not particularly limited and, from the viewpoint of further improving the effect of the present invention, is preferably 0.1 to 3.0 μm, more preferably 0.2 to 2.0 μm, and still more preferably 0.5 to 1.5 μm.

The line width W1 of the black layer can be measured based on the method of measuring the line width Wa of the conductive thin wire, and the thickness T1 of the black layer can be measured based on the method of measuring the thickness Ta of the conductive thin wire.

Palladium-Containing Layer

The palladium-containing layer (Pd-containing layer) is a layer forming the conductive thin wire and is a layer including palladium (Pd).

The configuration of Pd (hereinafter, also referred to as "Pd component") in the Pd-containing layer is not particularly limited and may be a Pd single body or may be a mixture (Pd alloy) of Pd and metal other than Pd. Examples of the metal other than Pd include silver, copper, gold, and nickel.

In particular, it is preferable that the Pd-containing layer includes a Pd single body.

The Pd component (preferably a Pd single body) in the Pd-containing layer is likely to be Pd particles having a solid particle shape. An average particle diameter of the Pd particles in terms of sphere equivalent diameter is preferably 10 to 1000 nm and more preferably 10 to 200 nm. From the viewpoint of suppressing a change in the resistance value of the conductive thin wire in a wet heat environment, the average particle diameter is still more preferably 50 to 150 nm. The sphere equivalent diameter refers to the diameter of a spherical particle having the same volume. The average particle diameter of the Pd particles is obtained as an average value obtained by measuring sphere equivalent diameters of 100 target particles and arithmetically averaging the measured sphere equivalent diameters.

The shape of the Pd particles is not particularly limited, and examples thereof include a spherical shape, a cubic shape, a flat shape, an octahedral shape, and a tetradecahedron shape. In addition, a part or all of the Pd particles may be bonded by fusion welding.

The Pd-containing layer may have a structure in which the Pd component is dispersed in a polymer compound described below, and the Pd component may aggregate to be present as an aggregate in the polymer compound. In addition, at least a part of the Pd component in the Pd-containing layer may be bonded through metal derived from metal ions used in a plating treatment described below.

The content of the Pd component in the PD-containing layer is not particularly limited and, from the viewpoint of further improving the conductivity of the conductive film, the content of the Pd component (in terms of Pd element) per area of a region of the transparent substrate surface where the Pd-containing layer is disposed is preferably 1.0 to 20.0 $g/m^2$ and more preferably 2.0 to 10.0 $g/m^2$.

The Pd-containing layer may include a binder component.

The binder component in the Pd-containing layer is not particularly limited. For example, a well-known polymer compound can be used.

As the polymer compound in the Pd-containing layer, a hydrophobic polymer (water-insoluble polymer) can be used, and examples thereof include at least one resin selected from the group consisting of a (meth)acrylic resin), a styrene resin, a vinyl resin, a polyolefin resin, a polyester resin, a polyurethane resin, a polyamide resin, a polycarbonate resin, a polydiene resin, an epoxy resin, a silicone resin, a cellulose polymer, a chitosan polymer, and gelatin or a copolymer that consists of monomers forming the resins.

In addition, it is preferable that the polymer compound has a reactive group that reacts with a crosslinking agent described below.

It is preferable that the polymer compound has a particle shape. That is, it is preferable that the Pd-containing layer includes particles of a specific polymer.

The polymer compound can be synthesized, for example, with respect to JP3305459B and JP3754745B.

The weight-average molecular weight of the polymer compound is not particularly limited and is preferably 2000 to 1000000, more preferably 2000 to 750000, and still more preferably 3000 to 500000.

The polymer compound in the Pd-containing layer may be used alone or in combination of two or more kinds.

The content of the polymer compound in the Pd-containing layer with respect to the total mass of the Pd-containing layer is preferably 1 mass % or more and more preferably 5 mass % or more. The upper limit value is not particularly limited and may be a remainder other than the Pd component and is preferably 50 mass % or less.

The Pd-containing layer may include metal other than Pd. Examples of the metal other than Pd include silver, copper, gold, nickel, and iron.

The content of the metal other than Pd with respect to the total mass of the Pd-containing layer is preferably 20 mass % or less and more preferably 5 mass % or less.

Optionally, the Pd-containing layer may include additives other than the above-described components.

Examples of the additives include an antistatic agent, a nucleation accelerator, a spectral sensitizing dye, a surfactant, an antifoggant, a hardening agent, a black pepper inhibitor, a redox compound, a monomethine compound, and dihydroxybenzenes described in paragraphs "0220" to "0241" of JP2009-004348A.

In addition, the Pd-containing layer may include a crosslinking agent used for crosslinking the above-described polymer compounds. By including the crosslinking agent, crosslinking between the specific polymers progresses, and linking between the metals in the Pd-containing layer is maintained.

On the other hand, the content of the carbon black in the Pd-containing layer with respect to the total mass of the Pd-containing layer is preferably 10 mass % or less, and it is more preferable that the Pd-containing layer does not substantially include carbon black. The lower limit is not particularly limited and may be 0 mass %.

In addition, the content of the colorant in the Pd-containing layer with respect to the total mass of the Pd-containing layer is preferably 5 mass % or less, and it is more preferable that the Pd-containing layer does not substantially include the colorant. The lower limit is not particularly limited and may be 0 mass %.

From the viewpoint of further improving the effect of the present invention and the conductivity, a line width W2 of the Pd-containing layer is preferably 0.5 μm or more, more preferably 0.8 μm or more, and still more preferably 1.0 μm or more. The reason for this is presumed to be that, in a case where the line width W2 is the lower limit value or more, the adhesion area with the metal plating layer increases. The upper limit of the line width W2 is not particularly limited and, from the viewpoint of further improving the effect of the present invention, is preferably 2.5 μm or less, more preferably 1.9 μm or less, and still more preferably 1.5 μm or less. The reason for this is presumed to be that, in a case where the line width W2 is the upper limit value or less, stress generated between the Pd-containing layer and the metal plating layer can be suppressed.

A thickness T2 of the Pd-containing layer is not particularly limited and is preferably 0.05 to 1.5 μm, more preferably 0.1 to 0.8 μm, and still more preferably 0.2 to 0.5 μm.

The line width W2 of the Pd-containing layer can be measured based on the method of measuring the line width Wa of the conductive thin wire, and the thickness T2 of the Pd-containing layer can be measured based on the method of measuring the thickness Ta of the conductive thin wire.

Metal Plating Layer

The metal plating layer is a layer forming the conductive thin wire, and is a layer that is disposed on the side of the Pd-containing layer opposite to the transparent substrate.

The metal in the metal plating layer is not particularly limited, and a well-known metal can be used.

Examples of the metal in the metal plating layer include a single body of metal selected from the group consisting of silver, copper, gold, nickel, cobalt, and palladium and a mixture (alloy) of two or more metals selected from the above-described group. In particular, from the viewpoint of further improving the conductivity, at least one of silver or copper is preferable, a copper single body or a copper alloy of copper and metal selected from the group consisting of silver, gold, nickel, cobalt, and palladium is more preferable, and a copper single body is still more preferable.

It is preferable that the metal plating layer includes the above-described metal as a main component.

The metal plating layer "including the metal as a main component" represents that the content of the metal is 50 mass % or more with respect to the total mass of the metal plating layer. The content of the metal (more preferably copper or a copper alloy) in the metal plating layer with respect to the total mass of the metal plating layer is preferably 90 mass % or more and more preferably 95 mass % or more. The upper limit value is not particularly limited and may be 100 mass % with respect to the total mass of the metal plating layer.

From the viewpoint of further improving the effect of the present invention and the conductivity, a line width W3 of the metal plating layer is preferably 0.5 μm or more, more preferably 1.0 μm or more, and still more preferably 1.5 μm or more. The upper limit is not particularly limited and, from the viewpoint of further improving the effect of the present invention, is preferably 5.0 μm or less, more preferably 2.5 μm or less, and still more preferably 2.0 μm or less.

From the viewpoint of further improving the conductivity, a thickness T3 of the metal plating layer is preferably 0.1 μm or more and more preferably 0.3 μm or more. The upper limit is not particularly limited and is preferably 3.0 μm or less and more preferably 1.0 or μm or less.

The line width W3 and the thickness T3 of the metal plating layer can be measured based on the method of measuring the line width Wa and the thickness Ta of the conductive thin wire.

In addition, from the viewpoint of further improving the effect of the present invention, a ratio (W3/W1) of the line width W3 of the metal plating layer to the line width W1 of the black layer is preferably 1.00 to 1.25 and more preferably more than 1 to 1.1.

Other Members

The conductive film may include other members other than the transparent substrate, the black layer, and the conductive thin wire described above and a transparent insulating portion.

Examples of the other members that may be included in the conductive film include a blackening layer, a transparent insulating portion, and a conductive portion having a different configuration from the conductive thin wire described below.

Blackening Layer

The conductive thin wire of the conductive film may include a blackening layer that is disposed on the side of the metal plating layer opposite to the transparent substrate. That is, the conductive thin wire may include the black layer, the palladium-containing layer, the metal plating layer, and the blackening layer in order from the transparent substrate side.

The blackening layer has a function of preventing reflection of light from the conductive thin wire that is disposed on the top surface (visible-side surface) of the transparent substrate to further improve the visibility. Examples of the blackening layer include a well-known black plating layer such as a black chromium plating layer, a black nickel plating layer, or a black alumite plating layer.

The blackening layer can be formed through a plating treatment using a well-known black metal material.

Transparent Insulating Portion

The conductive film may include the transparent insulating portion in the non-thin wire region where the conductive thin wire is not disposed on the surface of the side where the conductive thin wire is disposed.

It is preferable that the transparent insulating portion is disposed next to the conductive thin wire and is adjacent to the conductive thin wire in the width direction of the conductive thin wire.

The transparent insulating portion is a member that does not have conductivity without including conductive metal. Here, the transparent insulating portion "not including metal" represents that the content of the metal in the transparent insulating portion is 0.1 mass % or less with respect to the total mass of the transparent insulating portion.

As a material forming the transparent insulating portion, a polymer compound is preferable. Examples of the polymer compound include the polymer compound in the conductive thin wire. The polymer compound forming the transparent insulating portion may be the same as or different from the polymer compound in the conductive thin wire.

The thickness of the transparent insulating portion is not particularly limited and is preferably 1 to 15 μm and more preferably 2 to 10 μm. The thickness of the transparent insulating portion can be measured based on the method of measuring the thickness Ta of the conductive thin wire.

A method of forming the transparent insulating portion using a composition for forming the transparent insulating portion is not particularly limited. Examples of the method include a method including: applying the composition to the surface of the transparent substrate on the side where the conductive thin wire is disposed; and optionally curing the coating film to form the transparent insulating portion.

Method of Manufacturing Conductive Film

Next, a method of manufacturing the present conductive film will be described.

The method of manufacturing the present conductive film is not particularly limited as long as the conductive film having the above-described configuration can be manufactured. Examples of the method of manufacturing the present conductive film include a method including: a black layer forming step of forming the black layer on at least one surface of the transparent substrate using a well-known method; a Pd-containing layer forming step of forming the Pd-containing layer on the formed black layer; and a metal plating layer forming step of selectively forming the metal plating layer using a plating method on the surface of the formed Pd-containing layer.

Black Layer Forming Step

A method of forming the black layer is not particularly limited, and a well-known method of forming a patterned coating film on the transparent substrate can be applied. Examples of the method of forming the black layer include: a method of printing a pattern of a composition for forming the black layer including carbon black, a resin, and an optional component such as another colorant on the transparent substrate; a method of printing a composition for forming the black layer further including a polymerizable compound to the entire surface of the transparent substrate and exposing and developing the printed composition to form the patterned black layer; and a method of printing the composition for forming the black layer to the entire surface of the transparent substrate and irradiating the composition with ultraviolet light, laser light, or the like through a mask pattern to remove an unnecessary portion such that the patterned black layer is formed.

Examples of a specific method in the method of forming the black layer by pattern printing include a screen printing method, a screen offset method, a gravure printing method, a gravure offset printing method, a flexographic printing method, an imprinting method, a reverse printing method, and an ink jet printing method. In particular, a screen printing method or an ink jet printing method is preferable.

The composition for forming the black layer used in the black layer forming step includes carbon black.

The content of the carbon black in the composition for forming the black layer is not particularly limited, and it is preferable that the content of the carbon black with respect to the total solid content of the composition is the same as the content of the carbon black with respect to the total mass of the black layer including the more preferable range.

The composition for forming the black layer may include not only the carbon black but also at least one selected from the group consisting of a solvent, the above-described resin or a precursor thereof, and the above-described additives.

From the viewpoint of handleability, it is preferable that the composition for forming the black layer includes a solvent.

The kind of the solvent is not particularly limited, and examples thereof include water and an organic solvent. Examples of the organic solvent include a well-known organic solvent (for example, an alcohol-based solvent, an ester-based solvent, a ketone-based solvent, an amide-based solvent, a nitrile-based solvent, a carbonate-based solvent, a halogen-based solvent, or a hydrocarbon-based solvent).

The content of the solvent in the composition for forming the black layer is not particularly limited, and is preferably 50 to 98 mass % and more preferably 60 to 95 mass % with respect to the total mass of the composition. The reason for this is that, in the above-describe range, the handleability of the composition for forming the black layer is excellent and the control of the thickness is simple.

A method of preparing the composition for forming the black layer is not particularly limited, and examples thereof include a method of collectively mixing the above-described respective components, and a method of mixing the respective components stepwise.

Pd-Containing Layer Forming Step

In the Pd-containing layer forming step, a well-known method is adopted without any particular limit as long as it is a method capable of forming the Pd-containing layer on the black layer formed in the black layer forming step.

Examples of the method of forming the Pd-containing layer include: a method of printing a pattern of a composition of the Pd component and the binder component on the black layer to form the Pd-containing layer; and a method of forming a coating film including the Pd component and the binder component on the entire surface of the transparent substrate on which the black layer is formed and removing the coating film that is formed in a region where the black layer is not present using a resist pattern to form the Pd-containing layer.

Examples of a specific method of printing the pattern for forming the Pd-containing layer include the pattern printing methods described in the black layer forming step. In particular, a screen printing method or an ink jet printing method is preferable.

Examples of the composition for forming the Pd-containing layer used for forming the coating film or printing the pattern in the Pd-containing layer forming step include a composition including the Pd component or a precursor thereof, a binder component, and an optional solvent.

The Pd component and the binder component in the composition for forming the Pd-containing layer are as described above. The composition for forming the Pd-containing layer may include colloidal Pd. In addition, the composition for forming the Pd-containing layer may include Pd ions as the precursor of the Pd component.

From the viewpoint of handleability, it is preferable that the composition for forming the Pd-containing layer includes a solvent. Examples of the solvent in the composition for forming the Pd-containing layer include various solvents that may be included in the composition for forming the black layer.

The content of the solvent in the composition for forming the Pd-containing layer is not particularly limited and, from the above-described viewpoint, is preferably 50 to 98 mass % and more preferably 60 to 95 mass % with respect to the total mass of the composition.

A method of preparing the composition for forming the Pd-containing layer is not particularly limited, and examples thereof include a method of collectively mixing the above-described respective components, and a method of mixing the respective components stepwise.

Metal Plating Layer Forming Step

The metal plating layer forming step is a step of selectively forming the metal plating layer on the surface of the Pd-containing layer formed in the Pd-containing layer forming step, and is specifically a step of performing a plating treatment on the Pd-containing layer.

A method of the plating treatment is not particularly limited, and examples thereof include electroless plating (chemical reduction plating or displacement plating) and electrolytic plating. Among these, electroless plating is preferable.

The electroless plating is a treatment of depositing metal by a chemical reaction using a solution in which metal ions to be deposited as a plating are dissolved. As the electroless plating, a well-known electroless plating technique is used.

Examples of the plating treatment include a copper plating treatment, a silver plating treatment, a nickel plating treatment, and a cobalt plating treatment. From the viewpoint of further improving the conductivity of the conductive thin wire, a copper plating treatment or a silver plating treatment is preferable, and a copper plating treatment is more preferable.

Components in the plating liquid used in the plating treatment are not particularly limited. In addition to the solvent (for example, water), the plating liquid is likely to include metal ions for plating, a reducing agent, an additive (stabilizer) for improving the stability of the metal ions, and a pH adjuster. This plating liquid may further include a well-known additive in addition to the above-described components.

The kind of the metal ions for plating in the plating liquid is appropriately selected depending on the metal species to be deposited, and examples thereof include silver ions, copper ions, nickel ions, and cobalt ions.

A procedure of the plating treatment is not particularly limited as long as it is a method of bringing the Pd-containing layer on the transparent substrate and the plating liquid into contact with each other, and examples thereof include: a method of dipping the transparent substrate including the black layer and the Pd-containing layer in the plating liquid; and a method of applying the plating liquid to the surface of the transparent substrate where the black layer and the Pd-containing layer are disposed.

The contact time of the Pd-containing layer and the plating liquid is not particularly limited and is preferably 20 seconds to 30 minutes from the viewpoints of further improving the conductivity of the conductive thin wire and the productivity.

By performing the black layer forming step, the Pd-containing layer forming step, and the metal plating layer forming step to form the conductive thin wire having the laminated structure where the black layer, the Pd-containing layer, and the metal plating layer are laminated in order, the mesh pattern is provided on the transparent substrate.

The method of manufacturing the present conductive film is not limited to the method including the black layer forming step, the Pd-containing layer forming step, and the metal plating layer forming step. The present conductive film can also be manufactured, for example, by applying the composition for forming the black layer to the entire surface of the transparent substrate to form a coating layer, applying the composition for forming the Pd-containing layer to the entire surface of the formed coating layer to form a laminate, pattern-exposing and developing the formed laminate to remove an unnecessary region of the laminate, and selectively forming the metal plating layer using a plating method on the surface of the patterned laminate consisting of the black layer and the Pd-containing layer.

The conductive film including the mesh pattern disposed on both surfaces of the transparent substrate can be manufactured by performing the series of steps on both surfaces of the transparent substrate. The procedure of the respective steps that are performed at this time is not particularly limited. For example, the present conductive film can be manufactured by forming the patterned laminate consisting of the black layer and the Pd-containing layer on both surfaces of the transparent substrate using the above-described method and subsequently forming the metal plating layer on each of the formed Pd-containing layers. In addition, the present conductive film can also be manufactured by sequentially forming the black layer, the Pd-containing layer, the metal plating layer on one surface of the transparent substrate and sequentially forming the black layer, the Pd-containing layer, the metal plating layer on another surface of the transparent substrate.

Use of Conductive Film

The conductive film obtained as described above can be applied to various uses and, for example, a touch panel (or a touch panel sensor), a semiconductor chip, various electrical wiring plates, flexible printed circuits (FPC), a chip on film (COF), tape automated bonding (TAB), an antenna, a multilayer interconnection board, or a motherboard. In particular, the present conductive film is preferably used for a touch panel (a capacitance-type touch panel).

In the touch panel including the present conductive film, the conductive thin wire can effectively function as a detection electrode. In a case where the present conductive film is used in a touch panel, examples of a display panel that is used in combination with the conductive film include a liquid crystal panel and an organic light emitting diode (OLED) panel. In particular, the conductive film is preferably used in combination with an OLED panel.

The conductive film may further include a conductive portion having a different configuration from the conductive thin wire separately from the conductive thin wire. This conductive portion may be electrically connected to the above-described conductive thin wire for electrical connection. Examples of the conductive portion include a peripheral wire having a function of applying a voltage to the above-described conductive thin wire and an alignment mark for adjusting the position of a member to be laminated with the conductive film.

Examples of uses of the present conductive film other than the above-described uses include an electromagnetic wave shield that blocks electromagnetic waves such as radio waves or microwaves (ultra-high frequency radio waves) generated from an electronic apparatus such as a personal computer or a workstation and prevents static electricity. This electromagnetic wave shield can be used not only for the main body of the personal computer but also for an electronic apparatus such as an imaging apparatus or an electronic medical apparatus.

The present conductive film can also be used for a transparent heating element.

The present conductive film may also be used in the form of a laminate including the conductive film and another member such as a pressure-sensitive adhesive sheet or a peeling sheet during handling and transport. The peeling sheet functions as a protective sheet for preventing damage of the conductive film during the transport of the laminate.

In addition, the conductive film may be handled in the form of a composite body including the conductive film, the pressure-sensitive adhesive sheet, and the protective layer in this order.

Basically, the present invention is configured as described above. The present invention is not limited to the above-described embodiment, and various improvements and modifications can be made within a range not departing from the scope of the present invention.

EXAMPLES

The present invention will be described in more detail based on the following examples. Materials, used amounts, ratios, treatment details, treatment procedures, and the like shown in the following examples can be appropriately changed within a range not departing from the scope of the present invention. Therefore, the range of the present invention is not limited to the following specific examples.

Unless specified otherwise, "part(s)" and "%" represent "part(s) by mass" and "mass %".

Example 1

Preparation of Composition for Forming Black Layer

The following components were mixed while being stirred, and thus a composition 1 for forming the black layer was prepared.

- Carbon black: 4.7 mass %
- Acrylic monomer (DPHA, manufactured by Daicel-Allnex Ltd.): 34.9 mass %
- Photopolymerization Initiator (Omnirad 907, IGM Resins B.V.): 0.4 mass %
- Solvent (2-butanone): 30.0 mass %
- Solvent (cyclopentanone): 30.0 mass %

The carbon black was "RCF #20" (manufactured by Mitsubishi Chemical Corporation), and an average particle diameter was 50 nm.

Preparation of Composition for Forming Pd-Containing Layer

The following components were mixed while being stirred, and thus a composition 1 for forming the Pd-containing layer was prepared.

- Nanopalladium dispersion liquid (manufactured by Renaissance Energy Research Co., Ltd.): 5.0 mass %
- Acrylic monomer (DPHA, manufactured by Daicel-Allnex Ltd.): 75.0 mass %
- Photopolymerization Initiator (Omnirad 907, IGM Resins B.V.): 1.0 mass %

Dispersant (Solsperse 24000, manufactured by The Lubrizol Corporation): 1.0 mass %

Solvent 2-butanone: 18.0 mass %

Preparation of Conductive Film

The composition 1 for forming the black layer was applied using a lip coater to a surface of a polyethylene terephthalate film (manufactured by FUJIFILM Corporation) having a thickness of 38 μm, and was dried. The composition 1 for forming the Pd-containing layer was applied using a lip coater to a surface of the obtained coating film and was dried. As a result, a laminate was obtained.

Figure 3A:
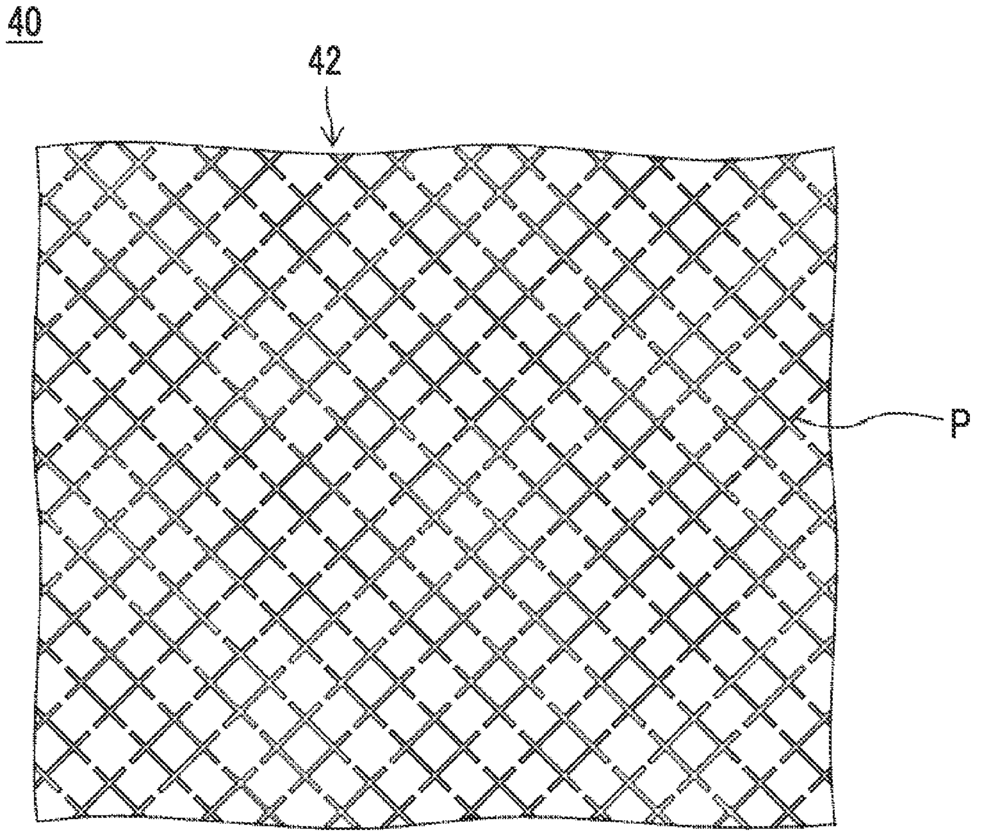
FIGS. 3A and 3B are plan views showing an example of a configuration of a mesh pattern in a conductive film prepared in Example.
Figure 3B:
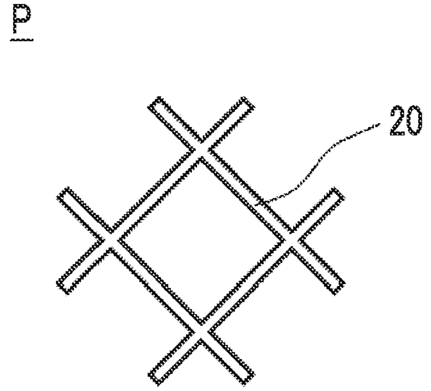

A negative mask pattern having the pattern shown in FIGS. 3A and 3B is disposed on the surface of the obtained laminate, the laminate was irradiated with ultraviolet light having a wavelength of 365 nm using a high-pressure mercury lamp through the negative mask pattern, and the pattern exposure was performed. The exposure amount was 500 $mJ/cm^2$.

Next, after removing the mask pattern, spray development was performed on the entire surface of the exposed laminate with a 1 mass % sodium carbonate aqueous solution (alkali developer, solution temperature: 30° C.) for 60 seconds at a pressure of 0.18 MPa (1.8 $kgf/cm^2$), and the coating film of the composition 1 for forming the black layer and the coating film of the composition 1 for forming the Pd-containing layer in a non-exposed portion of the laminate were dissolved and removed. Through the above-described development treatment, a patterned laminate shown in FIGS. 3A and 3B consisting of the black layer and the Pd-containing layer was formed.

Next, by repeating the series of steps on another surface of the transparent substrate, the patterned laminate consisting of the black layer and the Pd-containing layer is formed on both surfaces of the transparent substrate.

Next, the transparent substrate where the patterned laminate consisting of the black layer and the Pd-containing layer were provided on both surfaces was dipped in an electroless copper plating liquid THRU-CUP PEA (manufactured by C. Uyemura & Co., Ltd.) at room temperature for 30 minutes, and was cleaned with pure water. As a result, a conductive film 1 where the mesh pattern formed of the conductive thin wire including the black layer, the Pd-containing layer, and the copper plating layer in this order from the transparent substrate was provided on both surfaces of the transparent substrate was prepared.

FIGS. 3A and 3B are plan views showing an example of a configuration of a mesh pattern in a conductive film prepared in Example 1. A conductive film 40 shown in FIG. 3A includes a mesh pattern 42 where a unit pattern P is arranged in two directions orthogonal to each other in a plane. FIG. 3B is an enlarged plan view of the unit pattern P shown in FIG. 3A. As shown in FIG. 3B, the unit pattern P has a shape where two parallel line segments are orthogonal to two parallel line segments. Each of the four line segments forming the unit pattern P is the conductive thin wire 20 consisting of the black layer, the Pd-containing layer, and the copper plating layer.

In each of the unit patterns P, a distance between the centers of the two parallel line segments was 300 μm. That is, in each of the unit patterns P, a square non-thin wire region that was surrounded by the four conductive thin wires and where one side as a difference obtained by subtracting the line width Wa of the conductive thin wire from 300 μm was formed.

In addition, a distance between the unit patterns P adjacent to each other was 15 μm. That is, a line segment of one unit pattern P and a line segment of a unit pattern P adjacent to the unit pattern P that were on the same straight line were spaced from each other by 15 μm.

Measurement of Line Widths and Thicknesses of Conductive Thin Wire and Each of Layers The obtained conductive film according to Example 1 was cut to prepare a sample having a 1 cm×1 cm square shape where each of the sides was orthogonal to perpendicular to a width direction of the conductive thin wire. A platinum coating layer having a thickness 40 nm was deposited using an ion sputtering apparatus on a surface of the obtained sample where the mesh pattern was formed.

Next, the sample where the platinum coating layer was formed was processed by FIB under conditions of an acceleration voltage of 30 kV using a FIB-SEM apparatus ("Helios 600i" manufactured by Thermo Fisher Scientific Inc.) to be cut along a plane including a line width direction and a thickness direction. As a result, a slice having a thickness of 100 nm was prepared.

By performing elemental analysis on a cross section of the obtained slice using a TEM apparatus with an EDS (for example, "Talos F200X S/TEM, manufactured by Thermo Fisher Scientific Inc.; acceleration voltage: 200 kV), an element mapping image of a cross section including the line width direction and the thickness direction of the conductive thin wire (hereinafter, also referred to as "cross-sectional image") was obtained.

Based on the element distribution of the platinum coating layer in the cross-sectional image obtained using the above-described method, a maximum value of the line width of the conductive thin wire and an average value of the thickness thereof were measured.

In addition, based on the element distribution of the cross-sectional image obtained using the above-described method, the black layer, the Pd-containing layer, and the metal plating layer were distinguished from each other. Specifically, a region where Pd was detected in the Pd element distribution was determined as the Pd-containing layer. Next, a region where Pd was not present in the Pd element distribution and that was closer to the transparent substrate side than the Pd-containing layer was determined as the black layer. In addition, the region of the black layer matched with a region where C was present in the C element distribution. Next, a region where Cu was present in the Cu element distribution and Pd was not present in the Pd element distribution was determined as the metal plating layer.

In the measurement of the line width of each of the black layer, the Pd-containing layer, and the metal plating layer obtained using the above-described method, in one cross-sectional image, in a case where the line width of each of the layers varies depending on positions in the thickness direction or in a case where the thickness of each of the layers varies depending on positions in the width direction, a representative value of the line width of each of the layers and a representative value of the thickness thereof were determined using the following method.

The Pd-containing layer will be described as an example. A maximum distance in the width direction of the region where Pd was detected in the Pd element distribution of the cross-sectional image was determined as a representative value of the line width of the Pd-containing layer. In addition, the total width of the region where Pd was detected in the Pd element distribution of the cross-sectional image was divided into 10 regions from one end, a distance in the thickness direction of each of the divided regions was measured, and an average value obtained by arithmetically averaging the obtained 10 measured values was determined as a representative value of the thickness of the Pd-containing layer.

The representative value of each of the line width of the thickness of the black layer and the representative value of each of the line width and the thickness of the metal plating layer were measured based on the above-described measuring method.

Using the above-described method, slices of the conductive thin wires at 10 different positions of the sample with the platinum coating layer were prepared, and the line widths and the thicknesses of the conductive thin wire and each of the layers in the conductive thin wires were obtained from the cross-sectional images of the obtained slices. By arithmetically averaging the obtained representative values of the line widths of the 10 points and the obtained representative values of the thicknesses of the 10 points, the line width Wa and the thickness Ta of the conductive thin wire, the line width W1 and the thickness T1 of the black layer, the line width W2 and the thickness T2 of the Pd-containing layer, and the line width W3 and the thickness T3 of the metal plating layer were calculated. The line width and the thickness of each of the layers obtained in the conductive film 1 according to Example 1 are shown in Table 1 below.

The line width Wa of the conductive thin wire was the same as the maximum value among the line width W1 of the black layer, the line width W2 of the Pd-containing layer, and the line width W3 of the metal plating layer, and the thickness Ta of the conductive thin wire was the same as the sum of the thickness T1 of the black layer, the thickness T2 of the Pd-containing layer, and the thickness T3 of the metal plating layer.

Examples 2 to 7 and 24

Conductive films according to Examples 2 to 7 and 24 were prepared using the method as described in Example 1, except that the line width of the black layer formed in the black layer forming step, the line width W2 of the Pd-containing layer formed in the Pd-containing layer forming step, the dipping time of the plating liquid in the metal plating layer forming step, and the like were changed such that the line width W1 and the thickness T1 of the black layer, the line width W2 and the thickness T2 of the Pd-containing layer, and the line width W3 of the thickness T3 of the metal plating layer are numerical values shown in Table 1 below.

Examples 8 to 12

Conductive films according to Examples 8 to 12 were prepared using the method as described in Example 3, except that carbon black having an average particle diameter of a numerical value described in Table 1 below was used instead of the carbon black used for preparing the composition 1 for forming the black layer.

In Examples 8 to 12, carbon black that was commercially available as "SB935" or the like manufactured by Asahi Carbon Co., Ltd. was used.

Examples 13 to 17

Conductive films according to Examples 13 to 17 were prepared using the method as described in Example 3, except that the content of the carbon black in the composition for forming the black layer was adjusted such that the content of the carbon black in the black layer was a numerical value shown in Table 1 below.

Examples 18 to 23

Conductive films according to Examples 18 to 23 were prepared using the method as described in Example 3, except that the thickness of the printing layer of the composition 1 for forming the black layer printed in the black layer forming step was adjusted such that the thickness T1 of the black layer was a numerical value shown in Table 1 below.

Comparative Example 1

A conductive film according to Comparative Example 1 was prepared using the method as described in Example 1, except that the patterned Pd-containing layer was directly formed on the transparent substrate in the Pd-containing layer forming step without performing the black layer forming step.

Comparative Example 2

A conductive film according to Comparative Example 2 was prepared using the method as described in Example 1, except that the composition for forming the black layer not including carbon black was prepared without using carbon black.

Evaluation

Regarding the conductive film according to each of Examples and Comparative Examples, the adhesiveness of the conductive thin wire after a durability test was evaluated in the following procedure.

First, the conductive film was cut to prepare a sample having a size of a length of 50 mm and a width of 50 mm. The obtained sample was evaluated under the following conditions using a method described in JIS B 7753 (2007) in an experiment bath including a black panel.

SUNSHINE carbon arc

Illuminance: 255 W/m$^2$ (300 to 700 nm)

Test time: 1,083 h (78.5 W/m$^2$)

Black panel temperature: 63° C.

Humidity in bath: 55%

Next, tape "610" manufactured by 3M (width: 25.4 mm) was bonded to a bottom surface of the sample (surface of the conductive film opposite to the light source side) after the durability test over a length of 1 cm or more, and the bonded tape was peeled off from the bottom surface of the sample.

Regarding each of the unit patterns P in the entire region where the tape was bonded (in other words, each of the unit patterns P where all the conductive thin wires were bonded to the tape), whether or not there were positions where the conductive thin wire was peeled off was checked using an optical microscope. A ratio (a peeling ratio of the unit patterns P) of the number of the unit patterns P where the conductive thin wire was peeled off even at one position to the total number of the unit patterns P in the entire region where the tape was bonded was calculated from the following calculation expression.

$$(\text{Number of Peeled Unit Patterns P}/\text{Total Number of Unit Patterns P})\times 100(\%)$$

The adhesiveness of the conductive thin wire after the durability test in the conductive film according to each of Examples and Comparative Examples was evaluated from the calculated peeling ratio of the unit patterns P based on the following standards.

Evaluation Standards

A: The peeling ratio was 0% or more and less than 20%

B: The peeling ratio was 20% or more and less than 40%

C: The peeling ratio was 40% or more and less than 60%

D: The peeling ratio was 60% or more and 100% or less

Table 1 below collectively shows the measurement results and the evaluation results of the conductive film manufactured in each of the examples.

In the table, the column "W3/W1" represents a ratio of the line width W3 (μm) of the metal plating layer to the line width W1 (μm) of the black layer.

TABLE 1

| | Black Layer | | | | Pd-Containing Layer | | Metal Plating Layer | | | |
|---|---|---|---|---|---|---|---|---|---|---|
| | Line Width W1 (μm) | Thickness T1 (μm) | Carbon Black Particle Diameter (nm) | Carbon Black Content (mass %) | Line Width W2 (μm) | Thickness T2 (μm) | Line Width W3 (μm) | Thickness T3 (μm) | W3/W1 | Adhesiveness Evaluation |
| Example 1 | 1.06 | 1.1 | 34 | 12 | 1.08 | 0.28 | 1.10 | 0.4 | 1.04 | B |
| Example 2 | 1.47 | 1.2 | 34 | 12 | 1.49 | 0.29 | 1.51 | 0.5 | 1.03 | A |
| Example 3 | 1.69 | 1.1 | 34 | 12 | 1.71 | 0.31 | 1.73 | 0.6 | 1.02 | A |
| Example 4 | 1.86 | 0.9 | 34 | 12 | 1.88 | 0.32 | 1.90 | 0.7 | 1.02 | A |
| Example 5 | 2.38 | 1.1 | 34 | 12 | 2.40 | 0.33 | 2.42 | 1.1 | 1.02 | B |
| Example 6 | 2.71 | 1.1 | 34 | 12 | 2.73 | 0.32 | 2.75 | 0.6 | 1.01 | C |
| Example 7 | 0.81 | 1.2 | 34 | 12 | 0.83 | 0.31 | 0.85 | 0.6 | 1.05 | C |
| Example 8 | 1.71 | 1.2 | 13 | 12 | 1.73 | 0.31 | 1.75 | 0.6 | 1.02 | C |
| Example 9 | 1.71 | 1.2 | 20 | 12 | 1.73 | 0.32 | 1.75 | 0.6 | 1.02 | B |
| Example 10 | 1.69 | 1.1 | 50 | 12 | 1.71 | 0.31 | 1.73 | 0.6 | 1.02 | B |
| Example 11 | 1.68 | 1.1 | 80 | 12 | 1.70 | 0.32 | 1.72 | 0.6 | 1.02 | B |
| Example 12 | 1.69 | 1.1 | 120 | 12 | 1.71 | 0.32 | 1.73 | 0.6 | 1.02 | C |
| Example 13 | 1.69 | 1.1 | 34 | 2 | 1.71 | 0.31 | 1.73 | 0.6 | 1.02 | B |
| Example 14 | 1.69 | 1.1 | 34 | 7 | 1.71 | 0.32 | 1.73 | 0.6 | 1.02 | B |
| Example 15 | 1.70 | 0.9 | 34 | 18 | 1.72 | 0.32 | 1.74 | 0.6 | 1.02 | B |
| Example 16 | 1.68 | 0.9 | 34 | 20 | 1.70 | 0.31 | 1.72 | 0.6 | 1.02 | B |
| Example 17 | 1.69 | 1.1 | 34 | 25 | 1.71 | 0.32 | 1.73 | 0.6 | 1.02 | C |
| Example 18 | 1.71 | 0.1 | 34 | 12 | 1.73 | 0.31 | 1.75 | 0.6 | 1.02 | C |
| Example 19 | 1.71 | 0.2 | 34 | 12 | 1.73 | 0.29 | 1.75 | 0.6 | 1.02 | B |
| Example 20 | 1.69 | 0.4 | 34 | 12 | 1.71 | 0.31 | 1.73 | 0.6 | 1.02 | B |
| Example 21 | 1.70 | 1.6 | 34 | 12 | 1.72 | 0.32 | 1.74 | 0.6 | 1.02 | B |
| Example 22 | 1.68 | 1.9 | 34 | 12 | 1.70 | 0.29 | 1.72 | 0.6 | 1.02 | B |
| Example 23 | 1.69 | 2.5 | 34 | 12 | 1.71 | 0.32 | 1.73 | 0.6 | 1.02 | C |
| Example 24 | 1.06 | 1.1 | 34 | 12 | 1.08 | 0.28 | 1.21 | 0.4 | 1.14 | C |
| Comparative Example 1 | — | — | — | — | 1.08 | 0.28 | 1.10 | 0.4 | — | D |
| Comparative Example 2 | 1.07 | 1.2 | — | — | 1.08 | 0.28 | 1.11 | 0.4 | 1.04 | D |

It was verified from the results shown in the table that, with the conductive film according to the present invention prepared in each of Examples, a conductive film having excellent adhesiveness of a conductive thin wire after a durability test can be provided as compared to the conductive film according to Comparative Example 1 where the black layer was not provided and the conductive film according to Comparative Example 2 where the interlayer not including carbon black was provided.

Explanation of References

10, 40: conductive film

12: transparent substrate

20: conductive thin wire

22: black layer

24: Pd-containing layer

26: metal plating layer

30: non-thin wire region

42: mesh pattern

P: unit pattern

What is claimed is:

1. A conductive film comprising:

a transparent substrate; and a mesh pattern that is disposed on the transparent substrate and is formed of a conductive thin wire, wherein the conductive thin wire includes a black layer including carbon black, a palladium-containing layer, and a metal plating layer in order from the transparent substrate side, and wherein a ratio of a line width of the metal plating layer to a line width of the black layer is more than 1 to 1.1.

2. The conductive film according to claim 1, wherein a line width of the metal plating layer is 1.0 to 2.5 μm.

3. The conductive film according to claim 1, wherein a line width of the black layer is 0.85 to 1.90 μm.

4. The conductive film according to claim 1, wherein a thickness of the black layer is 0.2 to 2.0 μm.

5. The conductive film according to claim 1, wherein an average particle diameter of the carbon black in the black layer is 10 to 120 nm.

6. The conductive film according to claim 1, wherein a content of the carbon black is 2 to 20 mass % with respect to a total mass of the black layer.

* * * * *